US006659648B1

(12) United States Patent
Bogdon et al.

(10) Patent No.: US 6,659,648 B1
(45) Date of Patent: Dec. 9, 2003

(54) BEARING INSERT FOR MOTOR OPERATORS

(75) Inventors: Erik Russel Bogdon, Carnegie, PA (US); Dave Curtis Turner, Imperial, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/164,894

(22) Filed: Jun. 7, 2002

(51) Int. Cl.[7] .................................... F16C 23/02

(52) U.S. Cl. ...................... 384/439; 384/441; 335/68; 200/400

(58) Field of Search ............................ 384/439, 441, 384/428; 335/68; 200/400

(56) References Cited

U.S. PATENT DOCUMENTS

| | | | | | |
|---|---|---|---|---|---|
| 5,261,658 | A | * | 11/1993 | Nagai | 384/439 |
| 5,511,885 | A | * | 4/1996 | Coleman | 384/439 |
| 6,380,829 | B1 | * | 4/2002 | Castonguay et al. | 335/68 |
| 6,448,522 | B1 | * | 9/2002 | Rosen et al. | 200/400 |

* cited by examiner

*Primary Examiner*—Leonard A. Footland
(74) *Attorney, Agent, or Firm*—Martin J. Moran

(57) ABSTRACT

A screw shaft for a motor operator is pivotally secured at each end by a bearing insert, with each bearing insert fitting within a channel defined within opposing walls of the housing.

20 Claims, 7 Drawing Sheets

BEARING INSERT FOR MOTOR OPERATORS

BACKGROUND OF THE INVENTION

1. Field of the Invention

The present invention relates to motor operators for circuit breakers. More specifically, the invention relates to an improved structure and method of assembly for a motor operator, providing a bearing insert at each end of the screw shaft, with the bearing adapted for easy insertion into opposing walls of the motor operator's housing.

2. Description of the Related Art

Circuit breakers are frequently actuated remotely, by securing a motor operator over the face of the circuit breaker, so that the motor operator can actuate the circuit breaker. A typical motor operator includes an electric motor, operatively connected through a system of gears to a threaded rod. A sliding actuator is threadedly connected to the threaded rod, so that rotation of the threaded rod causes the sliding actuator to reciprocate back and forth. The sliding actuator fits over the circuit breaker's operating handle, so that movement of the actuator moves the operating handle. A kill/toggle switch at each end of the sliding actuator's range of travel shuts off the current, and reverses the direction of current that will be supplied to the motor, upon being depressed by the sliding actuator. A printed circuit board will typically contain the motor operator's control circuitry. When the user transmits a signal to close the circuit breaker, the control circuitry will supply current to the motor, thereby rotating the threaded shaft to slide the sliding actuator from one end of its range of travel to the other, thereby moving the circuit breaker's operating handle, and closing the circuit breaker. Upon reaching the end of its range of travel wherein the circuit breaker is closed, the sliding actuator hits the toggle switch at that location, thereby shutting off current to the motor, and reversing the direction of current to the motor. When the user transmits a signal to open the circuit breaker, the control circuit will again supply current to the motor, thereby moving the sliding actuator to the opposite end of its range of travel, moving the circuit breaker's operating handle to its open position. As before, when the sliding actuator reaches the position wherein the circuit breaker is open, it strikes a kill/toggle switch, shutting off current to the motor, and reversing the direction of current flow to the motor.

The screw shaft of presently available motor operators is secured between opposing walls of the housing, so that assembly of the motor operator requires first installing various washers, retaining rings, bearings, a gear, and a sliding actuator on the screw shaft, bending the housing, inserting the screw shaft between the appropriate walls, and then allowing the housing to deflect back to its original position. In addition to making assembly of the motor operator unnecessarily difficult, the present design also precludes automated assembly of the motor operator.

Accordingly, a motor operator having an improved structure permitting simplified, and possibly automated, assembly is desired. Additionally, an improved method of assembling a motor operator is desired.

SUMMARY OF THE INVENTION

The present invention provides a bearing insert for the screw shaft of a motor operator, thereby permitting the screw shaft to be installed within the housing without the need to bend the opposing housing walls away from each other.

A preferred embodiment of the bearing insert is generally rectangular, and some embodiments may have a radiused or tapered bottom end. The bottom end of the bearing insert includes an aperture dimensioned and configured to receive one end of a screw shaft for a motor operator. The sides and bottom of the bearing insert include a plurality of flanges, dimensioned and configured to fit along both sides of the wall of a motor operators housing. In some preferred embodiments, at least one of these flanges may be extended, and may define an aperture, such as a threaded aperture, for receiving a screw or bolt.

To assemble a motor operator incorporating the present invention, a gear, sliding acuator, and other components typically installed on the threaded rod are first installed on this rod. Next, a bearing insert of the present invention is installed on each end of the screw shaft. The bearing inserts are then placed into channels dimensioned and configured to receive them, defined within opposing walls of the motor operators housing, with the flanges of each bearing insert fitting on each side of its corresponding wall. Lastly, bolts or screws may be passed through apertures within the housing, into the screw holes defined within the bearing insert.

Placing the screw shaft between a pair of bearing inserts of the present invention, and then installing the bearing inserts into appropriately configured channels within opposing walls of the motor operators housing, eliminates the need to bend the opposing walls of the motor operators housing away from each other in order to fit the ends of the screw shaft with an aperture as defined directly within these walls. Additionally, eliminating the need to bend the walls of the motor operators housing raises the possibility of using automated assembly methods, thereby reducing the cost of the motor operator.

BRIEF DESCRIPTION OF THE DRAWINGS

Like reference characters denote like features throughout the drawings.

DETAILED DESCRIPTION

Figure 1:
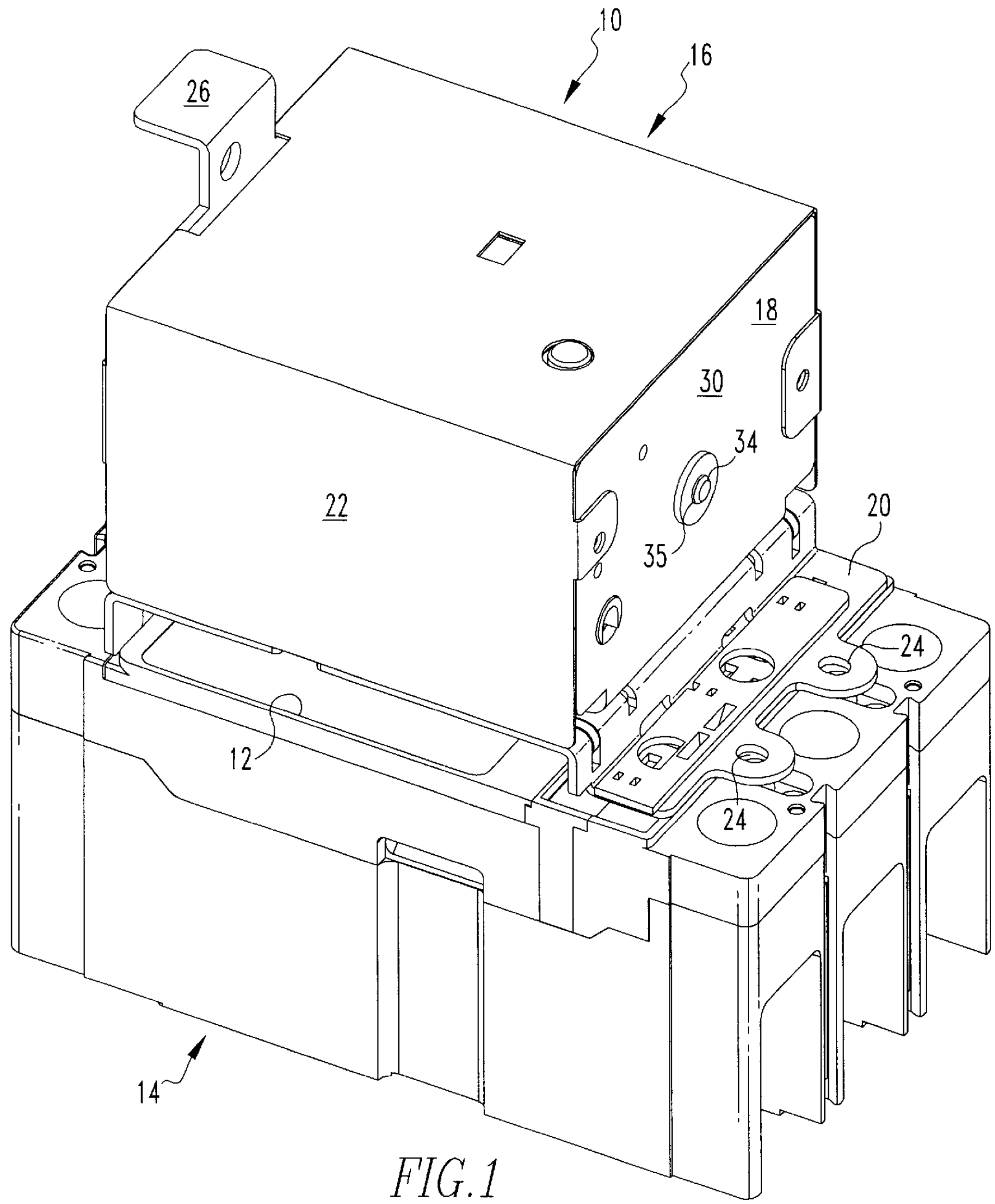
FIG.1 PRIOR ART
FIG. 1 is a top isometric view of a circuit breaker with its associated motor operator.

The present invention provides an improved structure and method of assembly for motor operators for circuit breakers.

FIGS. 1–4 illustrate a motor operator 10 mounted on the face 12 of a circuit breaker 14. The motor operator 10 includes a housing 16 having a base 18, mounting bracket 20, and cover 22. The base 18 is hingedly secured to the mounting bracket 20, which is in turn secured to the face 12 of the circuit breaker 14 by means well known in the art of circuit breakers, for example, screws passing through the apertures 24. The base 18 also includes a lifting tab 26, for lifting the hingedly secured base 18 away from the mounting bracket 20 to provide manual control of the circuit breaker 14. The housing 16 of the motor operator 10 also includes a cover 22, which, in conjunction with the base 18, fully encloses the motor operator 10.

Figure 2:
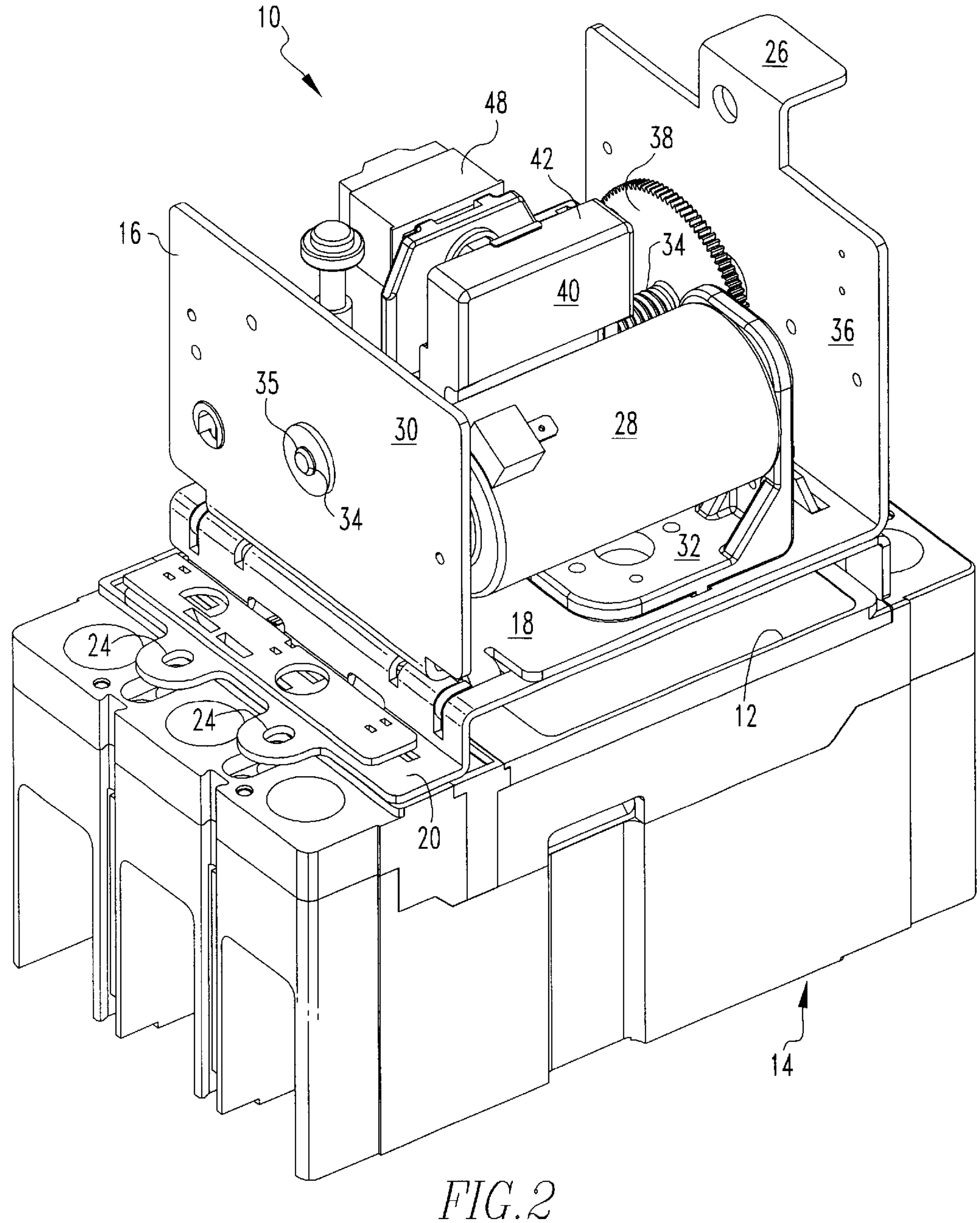
FIG. 2 PRIOR ART
FIG. 2 is a top isometric view of a circuit breaker and its associated motor operator, with the cover of the motor operator removed.
Figure 3:
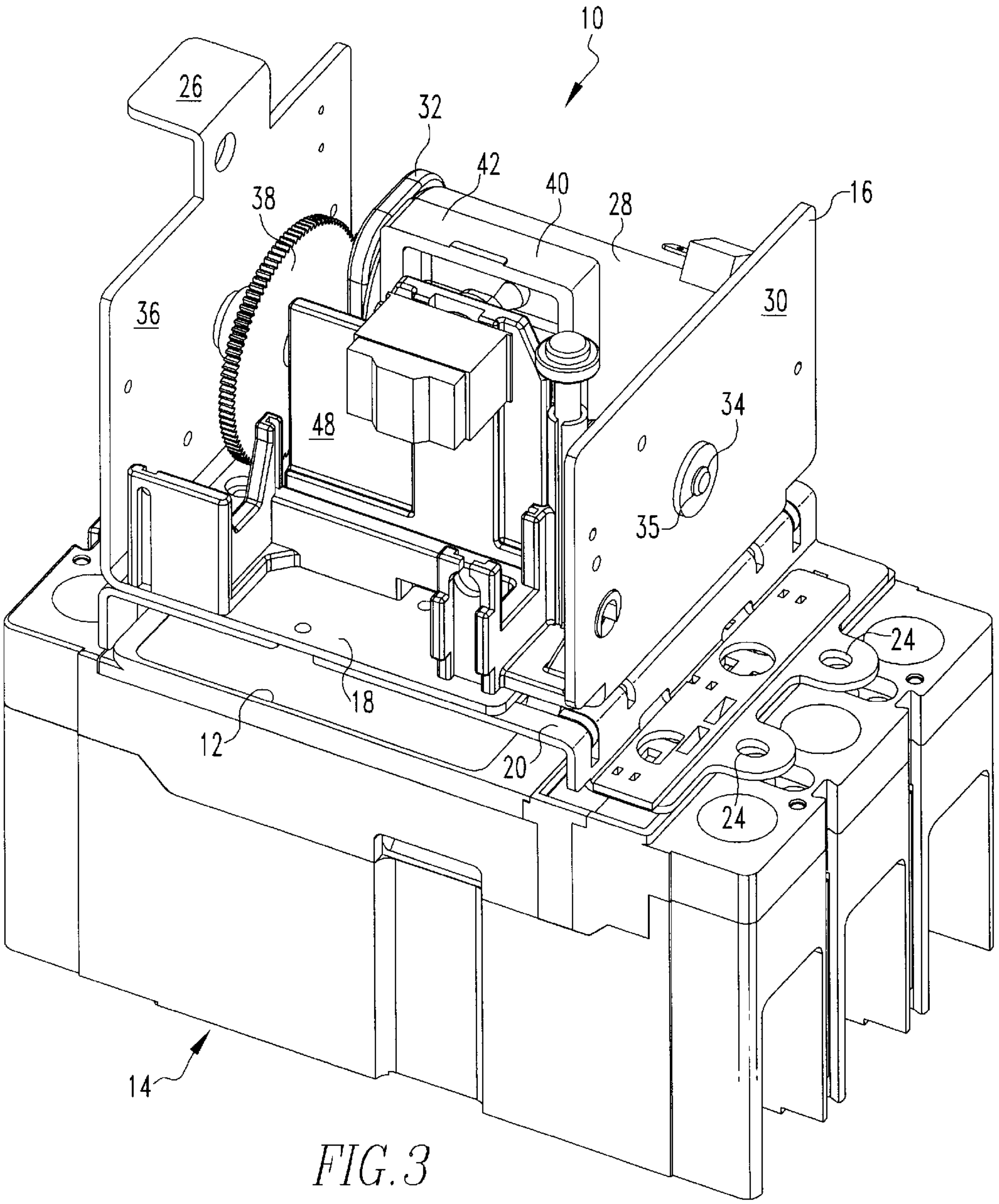
FIG. 3 PRIOR ART
FIG. 3 is a top isometric view of a circuit breaker and motor operator, with the cover of the motor operator removed
Figure 4:
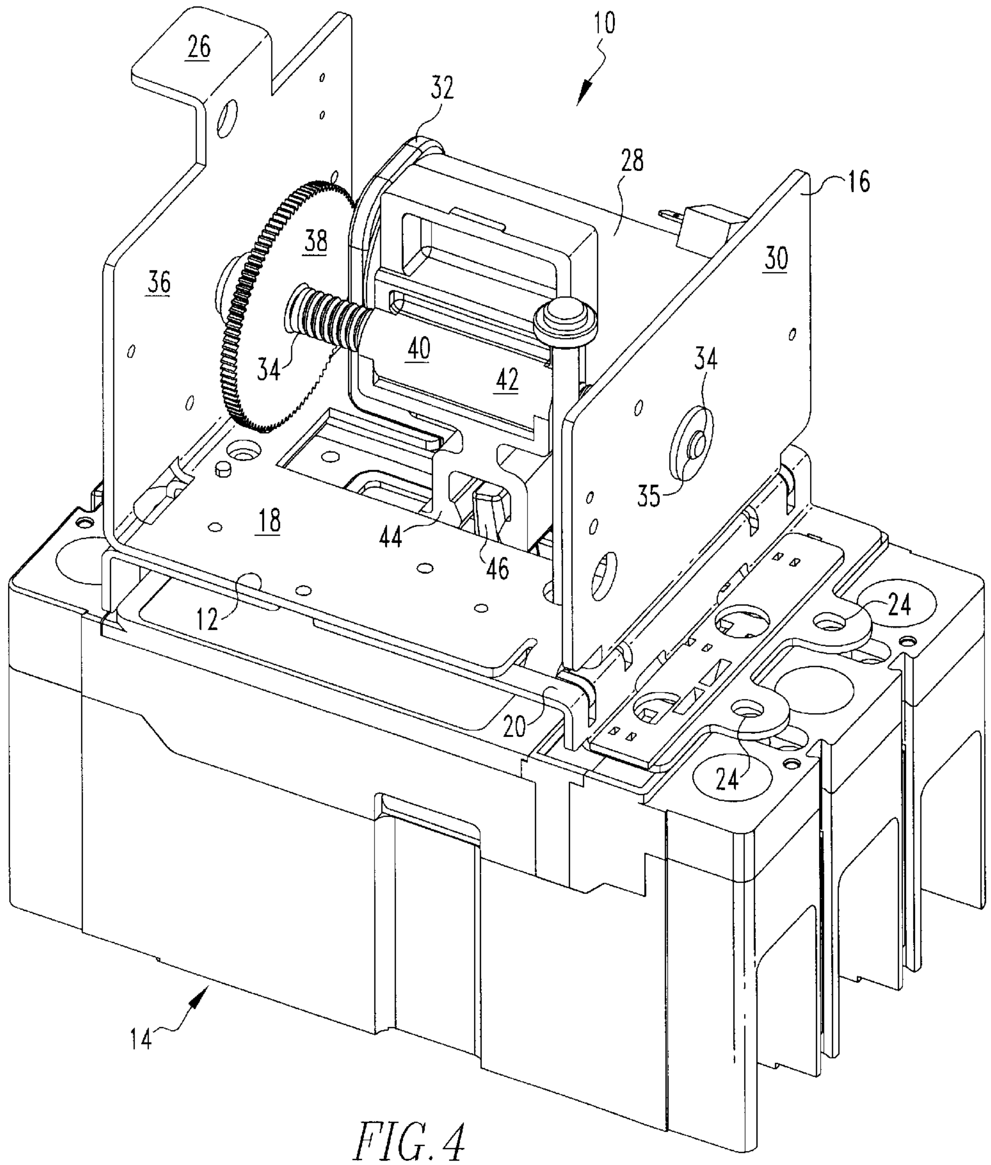
FIG. 4 PRIOR ART
FIG. 4 is a top isometric view of a circuit breaker and motor operator, with the cover and printed circuit board of the motor operator removed
Figure 5:
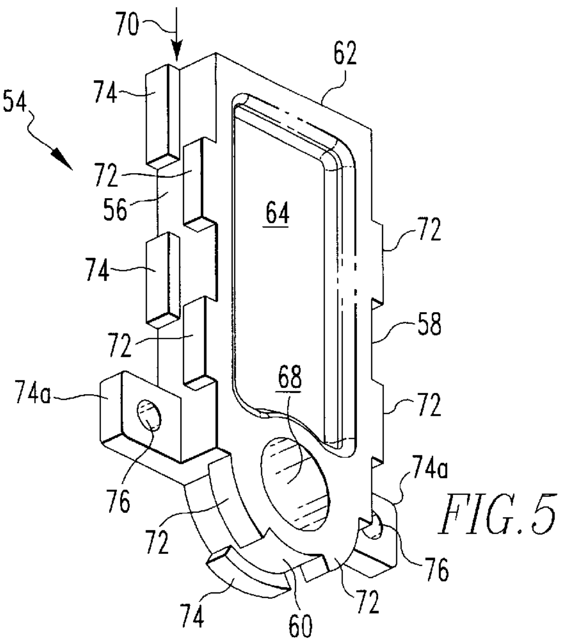
FIG. 5 is an isometric view of a bearing insert according to the present invention.
Figure 6:
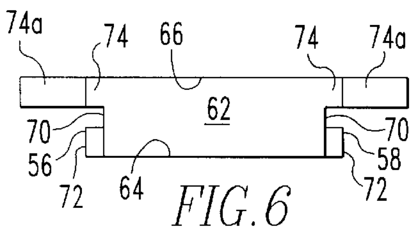
FIG. 6 is a top view of a bearing insert according to the present invention.
Figure 7:
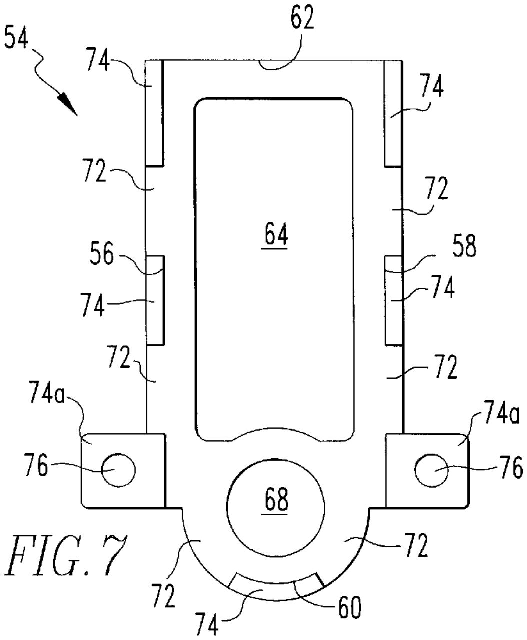
FIG. 7 is a front view of a bearing insert according to the present invention.
Figure 8:
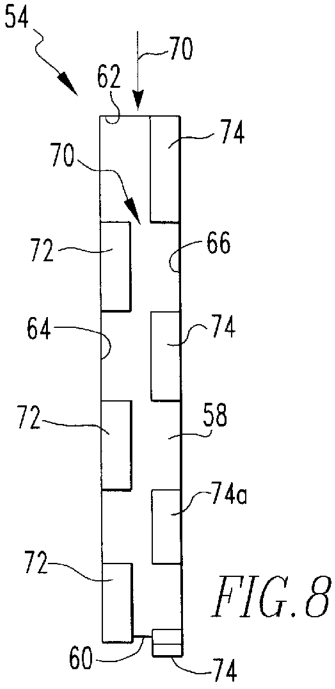
FIG. 8 is a side view of a bearing insert according to the present invention.

Referring to FIGS. 2–4, the motor operator 10 includes a motor 28, which in the present example is an electrical motor 28 secured between one wall 30 of the base 18 and the motor bracket 32. A screw shaft 34 extends between the wall 30 and wall 36 of the base 18, being rotatably secured therein at either end. Gear 38 is located at one end of the screw shaft 34, with the gear 38 operatively engaging a corresponding gear that is driven by the motor 28, so that the screw shaft 34 is thereby driven by the motor 32. A sliding actuator 40 includes an upper portion 42 that is threadedly connected to the screw shaft 34, and a lower portion 44 that engages the operating handle 46 of the circuit breaker 14. A kill/toggle switch is located at either end of the range of travel of the sliding actuator 40. The kill/toggle switches, which are not shown but are well known in the art, when actuated by the sliding actuator 40, will simultaneously shut off current to the motor 28, and reverse the direction of current through the motor 28. The flow of current through the motor 28 is further controlled through the printed circuit board 48, and its associated signal processing circuitry (well known in the art).

The motor operator 10 will typically be used to remotely control the operation of the circuit breaker 14 or for larger breakers that require substantial force on the operating handle. When the user transmits a signal to close the circuit breaker 14, the control circuitry within the PC board 48 will supply current to the motor 28, thereby rotating the screw shaft 34 to move the sliding actuator 40 from one end of its range of travel to the other, thereby moving the circuit breaker's operating handle 46, and closing the circuit breaker 14. Upon reaching the end of its range of travel wherein the circuit breaker 14 is closed, the sliding actuator 40 hits the kill/toggle switch at that location, thereby shutting off current to the motor 28, and reversing the direction of current to the motor 28. When the user opens the circuit breaker 14, the control circuit within the PC board 48 will again supply current to the motor 28, thereby moving the sliding actuator 40 to the opposite end of its range of travel along the screw shaft 34, moving the circuit breaker's operating handle 46 to the open position. As before, when a sliding actuator 40 reaches the position wherein the circuit breaker is open, it strikes a kill/toggle switch, shutting off current to the motor 28, and also reversing the direction of current flow to the motor 28.

From the above description, it becomes apparent that assembling a motor operator 10 must include the step of bending the wall 30 and/or the wall 36 so that the ends 50, 52 of the screw shaft 34 may be inserted into the apertures 35 of the walls 30, 36. This step must of course be done after installing the sliding actuator 40, gear 38, and other mounting hardware known in the art of motor operators on the screw shaft 34, while holding the other components on the screw shaft. Such an assembly procedure makes assembling the motor operator unnecessarily difficult, precluding automatic assembly methods.

Referring to FIGS. 5 to 8, this need is addressed by a bearing insert 54 of the present invention. Some preferred embodiments of the bearing insert 54 is generally rectangular, including a pair of substantially parallel sides 56, 58, a bottom 60, a top 62, an outside face 64, and an inside face 66. For purposes of this description, the term generally rectangular is defined as having substantially parallel sides 56, 58, and may include a rounded or tapered bottom 60 in some preferred embodiments, with the illustrated embodiments having a rounded, semi-circular bottom 60. Such a configuration both facilitates assembly, and provides complete covering of the channel 78 (described below). The bearing insert 54 includes an aperture 68, dimensioned and configured to receive an end 50, 52 of the screw shaft 34. The bearing insert 54 also includes means for securing the bearing insert 54 within a wall of a motor operators housing. Many preferred embodiments of the bearing insert 54 will include a channel 70 extending along its sides 56, 58 and bottom 60, dimensioned and configured to receive a wall 30, 36 of the motor operators housing 16. In the illustrated example, the channel 70 is defined between a plurality of outside flanges 72, depending outward from the sides 56, 58 and bottom 60 adjacent to the outside face 64, and the inside flanges 74, also depending outward from the sides 56,58 and bottom 60, adjacent to the inside face 66. In some preferred embodiments, at least one of the flanges 72, 74 may be extended, defining an aperture 76 dimensioned and configured to receive a bolt or a screw. In the illustrated example, two of the inside flanges 74, designated 74*a*, each define an aperture 76. In some preferred embodiments, the aperture 76 may be threaded.

The above-described preferred embodiment, utilizing the alternating flanges 72, 74, has the additional advantage of being easy to manufacture. Some preferred embodiments of the bearing insert 54 may be made from a molded polymer or resin. The alternating flanges 72, 74 provide for easy use of a straight draw mold to form the bearing insert 54, and facilitate removal of the bearing insert 54 from the mold.

Figure 9:
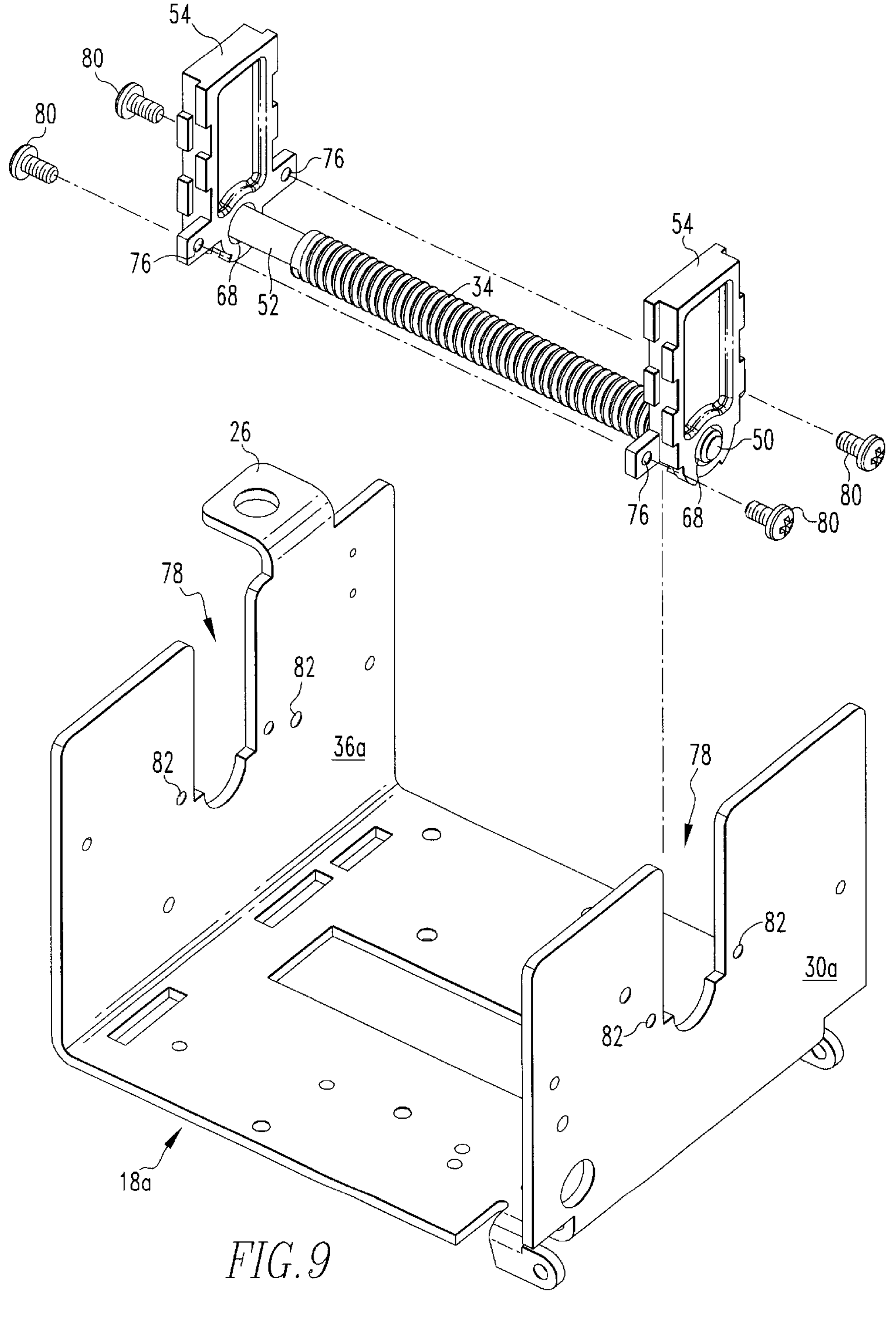
FIG. 9 is an exploded isometric view of a motor operator housing, screw shaft, and associated bearing inserts according to the present invention.
Figure 10:
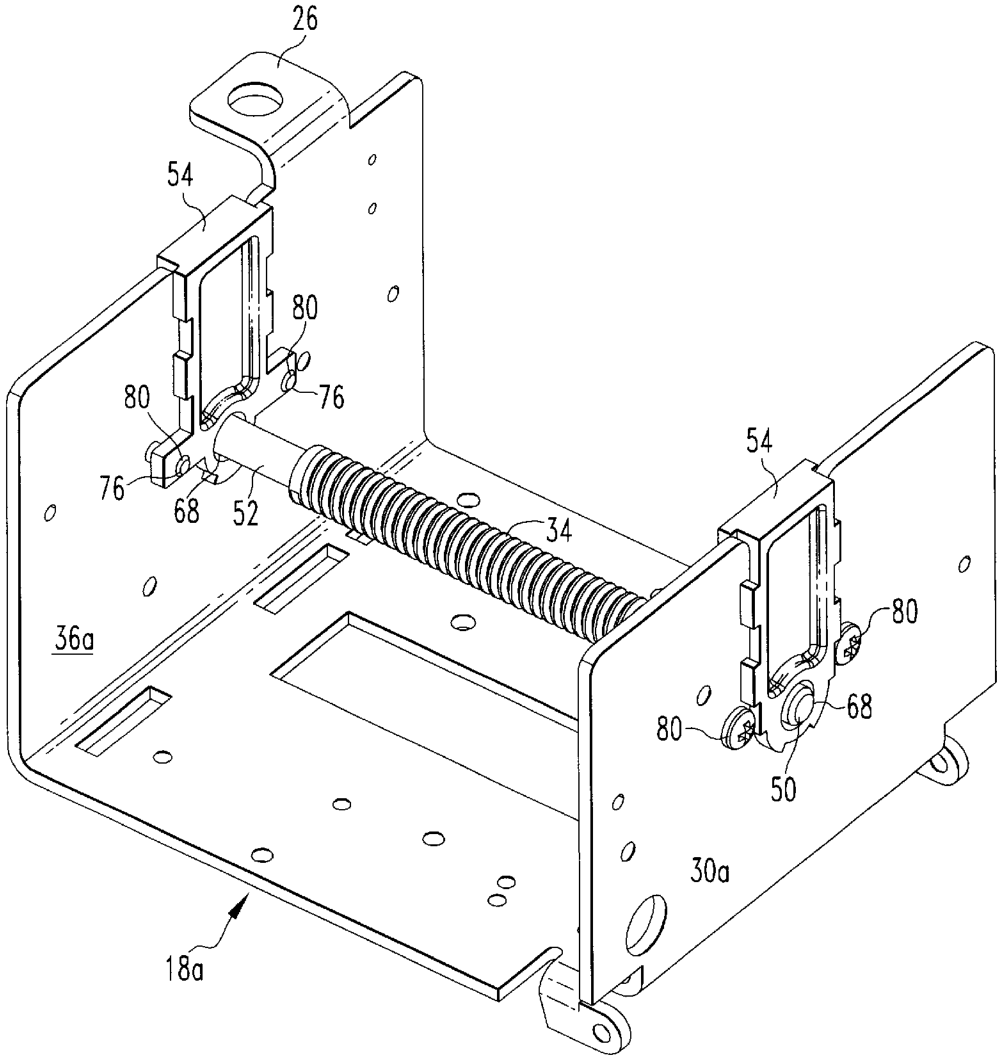
FIG. 10 is an isometric view of a housing for a motor operator, into which a screw shaft and its associated bearing inserts have been installed, according to the present invention.

Referring to FIGS. 9 to 10, a method of installing a screw shaft 34 within a housing 16, using the bearing insert 54, is illustrated. The walls 30*a*, 36*a* of the housings base 18*a* each include a channel 78, dimensioned and configured to receive the bearing insert 54. After the gear 38, sliding actuator 40, and any other necessary mounting hardware (not shown and well known in the art of motor operators) are installed on the screw shaft 34, the ends 50, 52 of the screw shaft 34 are each inserted into an aperture 68 of a bearing insert 54. The ends 50, 52 may have a smaller diameter than the remainder of the screw shaft 34, thereby defining a shoulder limiting the extent to which the screw shaft 34 may be inserted into the bearing insert 54, and locating the screw shaft 34. Each bearing insert 54 is then inserted into one of the channels 78 defined within the walls 30*a*, 36*a*, while maintaining the ends 50, 52 of the screw shaft 34 within the apertures 68. The rounded or tapered bottom 60 may facilitate this insertion is some embodiments. Lastly, the screws 80 are inserted through the apertures 82 within the walls 30*a*, 36*a*, and into the threaded apertures 76, thereby securing the bearing inserts 54 within the channels 78.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof

What is claimed is:

1. A bearing insert for motor operators, the motor operators comprising a housing having a pair of opposing walls, each wall having an inside surface, an outside surface, and a channel, and a rotatably mounted screw shaft having a pair of ends, and extending between said walls, said bearing insert comprising:

a body having a pair of side edges and a bottom edge;

an aperture within said body, dimensioned and configured to receive one of the ends of the screw shaft, and to fit within said channel; and means for securing said bearing insert within said channel.

2. The bearing insert according to claim 1, wherein said means for securing said bearing insert include a slot defined within said pair of side edges and said bottom edge, said slot being dimensioned and configured to receive a housing wall therein.

3. The bearing insert according to claim 1, wherein said means for securing said bearing insert within said channel include:

a plurality of outside flanges depending from said pair of side edges and said bottom edge;

a plurality of inside flanges depending from said pair of side edges and said bottom edge; and said plurality of outside flanges and being laterally spaced from said plurality of inside flanges to form said slot.

4. The bearing insert according to claim 3, wherein at least one of said plurality of flanges defines a hole dimensioned and configured to receive a fastening means selected from the group consisting of a screw and a bolt.

5. The bearing insert according to claim 4, wherein said hole is defined in one of said plurality of inside flanges.

6. The bearing insert according to claim 4, wherein said hole is threaded.

7. The bearing insert according to claim 1, wherein said bottom surface is rounded.

8. The bearing insert according to claim 1, wherein said bearing insert substantially fills said channel within said housing's wall.

9. A motor operator for a circuit breaker, comprising:

a housing having a pair of opposing walls, each wall having an inside surface, an outside surface, and a channel;

a rotatably mounted screw shaft having a pair of ends, and extending between said walls; and a bearing insert, comprising:

a body having a pair of side edges and a bottom edge, said body being dimensioned and configured to be received by said channel;

an aperture within said body, dimensioned and configured to receive one of said ends of said screw shaft; and means for securing said bearing insert within said channel.

10. The bearing insert according to claim 9, wherein said means for securing said bearing insert include a slot defined within said pair of side edges and bottom edge, and being dimensioned and configured to receive a housing wall therein.

11. The motor operator according to claim 9, wherein said means for securing said bearing insert within said channel include:

a plurality of outside flanges depending from said pair of side edges and said bottom edge;

a plurality of inside flanges depending from said pair of side edges and said bottom edge; and said plurality of outside flanges and being laterally spaced from said plurality of inside flanges to form said slot.

12. The motor operator according to claim 11, wherein at least one of said plurality of flanges defines a hole dimensioned and configured to receive a fastening means selected from the group consisting of a screw and a bolt.

13. The motor operator according to claim 12, wherein said hole is defined in one of said plurality of inside flanges.

14. The motor operator according to claim 12, wherein said hole is threaded.

15. The motor operator according to claim 9, wherein said bottom surface is rounded.

16. The motor operator according to claim 9, wherein said bearing insert substantially fills said channel within said housing wall.

17. A method of assembling a motor operator, comprising:

providing a screw shaft having a pair of ends;

providing a pair of bearing inserts, each bearing insert having an aperture dimensioned and configured to receive one of said ends of said screw shaft;

providing a housing having a pair of opposing walls, each wall defining a channel dimensioned and configured to receive said bearing insert;

inserting each of said ends of said screw shaft into said aperture of one of said bearing inserts;

inserting each of said bearing inserts into one of said channels, maintaining said ends of said screw shaft within said bearing inserts.

18. The method according to claim 17, further comprising securing each of said bearing inserts within each of said channels.

19. The method according to claim 18, wherein securing each of said bearing inserts within each of said channels includes:

providing a plurality of outside flanges depending from said pair of side edges and said bottom edge;

providing a plurality of inside flanges depending from said pair of side edges and said bottom edge; and said plurality of outside flanges and being laterally spaced from said plurality of inside flanges to form a slot.

20. The method according to claim 19, wherein securing each of said bearing inserts within each of said channels includes defining a hole within one of said flanges, dimensioned and configured to receive a fastening means selected from the group consisting of a screw and a bolt.

* * * * *